Figure 1:
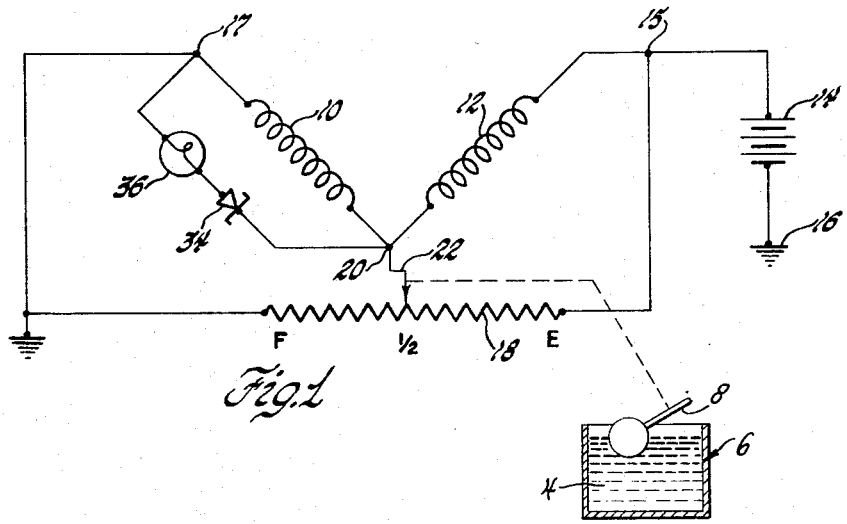

Nov. 1, 1966  J. A. STEWART  3,283,314

LOW FUEL WARNING SYSTEM

Filed Dec. 18, 1963

INVENTOR.
John A. Stewart
BY
Hugh L. Fisher
ATTORNEY

United States Patent Office 3,283,314
Patented Nov. 1, 1966

3,283,314
LOW FUEL WARNING SYSTEM
John A. Stewart, Flint, Mich., assignor to General Motors Corporation, Detroit, Mich., a corporation of Delaware
Filed Dec. 18, 1963, Ser. No. 331,483
7 Claims. (Cl. 340—181)

This invention relates to indicating mechanisms of the type using an electromagnetic coil for producing a magnetic field of variable magnitude in accordance with a condition being monitored and, more particularly, to a system for providing an auxiliary indication when the condition being monitored approaches a predetermined limit of variation.

Indicating mechanisms of the type employing at least one electromagnetic coil to produce a magnetic field of a magnitude related to a condition being monitored are used in many instances to give a primary indication of variable conditions such as temperature, pressure or liquid level. In connection with such indicating devices various schemes have been provided for indicating an extreme value or state in the condition being monitored. A common example is in the measurement of the quantity of liquid present in a remote container, such as an automobile fuel tank. In this instance, a suitable transducer, which may be float-controlled, is used to supply a variable voltage from a source to the electromagnetic coil to provide a magnetic field having a magnitude which corresponds to the level of fuel in the tank. A displaceable indicating mechanism, such as a magnetic armature and pointer combination, is responsive to the magnitude of the magnetic field to assume a position relative to an indicating scale which is indicative of the quantity of fuel remaining. Various schemes have been devised for providing an auxiliary warning of either visual or audible type when the level of fuel in the tank reaches a critical level. These schemes may be implemented, for example, by a contact on the movable indicating member which closes a circuit through the auxiliary warning device when the indicating member assumes a predetermined position. Alternatively, relays have been provided in circuit with the electromagnetic coil to close a circuit through the auxiliary warning device when the current through the coil reaches a predetermined value.

It is the primary object of the present invention to provide a system which gives an auxiliary warning of a predetermined extreme condition, and which does not require elaborate circuitry modifications to the condition monitoring system. Briefly, a specific embodiment of the invention contemplates the combination of an indicating device of the type employing an electromagnetic coil for producing a magnetic field of predetermined direction and of a magnitude which corresponds to a condition being monitored, suitable transducer means for supplying a variable voltage across the coils in accordance with the variations in the condition being monitored, asymmetrically conductive means such as a Zener diode connected across at least a portion of the electromagnetic coil in a direction such that the asymmetrically conductive means is normally non-conductive but is responsive to a critical level of the voltage across the portion of the coil to become conductive, and a current-sensitive warning means, such as a lamp or buzzer, connected in circuit with the asymmetrically conductive means for providing a warning signal of an auxiliary nature, when the critical value is reached.

Figure 2:
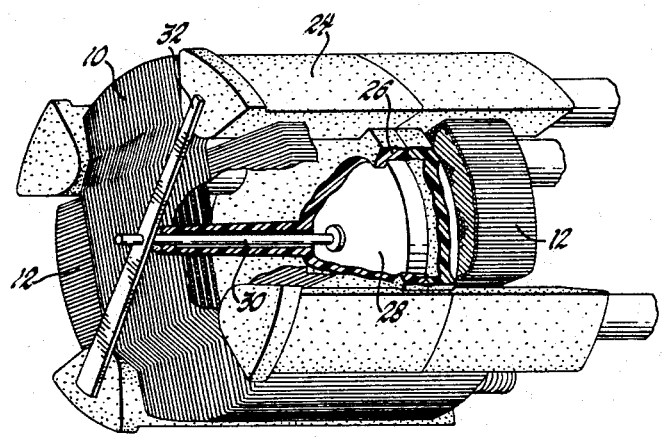

In a preferred form, the invention may be implemented by means of the series combination of a Zener diode and a warning lamp, this combination being connected in parallel with an electromagnetic coil which is part of an indicating device used to provide a primary indication of a condition being monitored. Upon the occurrence of a predetermined critical voltage level across the electromagnetic coil, the Zener diode becomes conductive, thereby energizing the warning lamp to provide the auxiliary indication. The invention may be best understood by reference to the following specification which describes a specific embodiment of the invention, and which is to be taken with the accompanying drawings of which:

FIGURE 1 is a schematic circuit diagram of an indicating device employing the present invention; and FIGURE 2 is a view of an air core indicator mechanism suitable for combination with the present invention.

Referring now to FIGURE 1, a specific embodiment of the present invention is shown incorporated into the standard two-wire gauge circuit. The two-wire gauge circuit employs a pair of orthogonally disposed electromagnetic coils 10 and 12 which are responsive to an energizing voltage to produce respective electromagnetic fields which are orthogonally disposed and which reciprocally vary in magnitude in accordance with a condition being monitored. In the present instance, it may be assumed that the condition being monitored is the level of fuel 4 in the tank 6 of an automotive vehicle.

For the purpose of providing suitable electrical signals to the coils 10 and 12, a source 14 of D.C. voltage, which may be the standard 12-volt battery of the automobile, has the positive terminal thereof connected to one side of the coil 12 as indicated at 15 and the negative terminal, which is shown as ground 16, to one side of the other coil 10 as indicated at 17. In addition, the source 14 is effectively connected across a sender resistor 18 such that a potential range across the resistor 18 corresponds substantially with that of the source 14. The sender resistor 18 is suitably marked with symbols designating the full, one-half and empty conditions of fuel in the tank 6. In addition, a point 20 to which the other side of each of the coils 10 and 12 is connected is communicated with the sender resistor 18 by means of a displaceable contact 22. The contact 22 may be moved along the sender wire 18 by means of a standard float mechanism 8 to thereby vary the potential appearing at point 20 throughout the range of the source 14.

With the circuit connected as shown in FIGURE 1, it can be seen that point 15 is maintained at a potential corresponding with the positive potential of the source 14. Similarly, point 17 is maintained at ground potential. The potential at point 20 is variable between the full potential of the source 14 and ground in accordance with the position of the movable contact 22. Thus, when the contact 22 is displaced to the far left or full position, as shown in the drawings, both sides of the coil 10 are effectively connected to ground and the potential thereacross is substantially zero. However, substantially the full potential of the source 14 appears across coil 12. Thus, the electromagnetic field which is produced by coil 12 is dominant.

In accordance with the common useage of the gauge circuit shown in FIGURE 1, a displaceable indicating member responsive to the relative magnitudes of the magnetic field produced by the coils 10 and 12 is provided. This indicating means takes the form of a rotatably mounted magnetic armature which is subject to the varying magnetic fields in the coils 10 and 12 to assume a position which is in alignment with the resultant field. This armature may be connected to an indicating needle for providing a calibrated indication. A system of this nature is shown in FIGURE 2.

Referring to FIGURE 2, the electromagnetic coils 10 and 12 are wound on a plastic bobbin 24 so as to be mutually perpendicular. Rotatably mounted in a central housing 26 of the bobbin 24 is a permanent magnet armature 28 in the form of a flat round disc which is diametrically magnetized. In this location the armature 28 is within the joint influence of the fields produced by the coils 10 and 12. The armature 28 is rotatably mounted on a shaft 30 extending through the center of the armature 28 and perpendicular thereto. Mounted on the external end of the shaft 30 is an indicator needle 32 the angular disposition of which is indicative of the direction of the resultant magnetic field produced by the coils 10 and 12.

Referring once again to FIGURE 1, it can be seen that as the level of fuel in the container 6 decreases such that the movable contact 22 moves to the right as shown in the drawing, the voltage appearing across coil 10 increases while the voltage appearing across coil 12 decreases. Thus, it is possible to relate the increasing magnitude of the voltage across coil 10 to an approaching empty condition in the fuel tank.

For the purpose of providing an auxiliary indication or warning indication of the approaching empty condition, an asymmetrically conductive element in the form of a Zener diode 34 is connected across points 17 and 20 which define the opposite ends of coil 10. More particularly, the cathode of the Zener diode is connected through an indicating lamp 36 to point 17 and the anode of the diode is connected to point 20. In this connection, the Zener diode 34 is normally non-conductive, but is responsive to a critical voltage value across coil 10 which may be chosen to correspond substantially to the threshold value of voltage of the Zener diode 34 to become conductive. When the Zener diode 34 becomes conductive, the electrical energy from source 14 is directed through the series combination of the diode 34 and the warning lamp 36. The lamp 36 is illuminated by this current to provide an auxiliary indication which tells the observer that the level of fuel in the tank has approached a near-empty condition. Obviously, the warning lamp 36 may be replaced with a warning device of any other suitable type such as a buzzer or other audible indication producing means.

It is to be understood that the invention is not limited to the combination of a two-wire gauge as shown in FIGURE 1, but is equally adaptable to use with any indicating mechanism employing at least one electromagnetic coil wherein the voltage across the coil is varied as a function of variation in the condition being monitored. Thus, the foregoing description of a specific embodiment is not to be construed in a limiting sense. For a definition of this invention, reference should be had to the appended claims.

What is claimed is:

1. In combination: an indicating device comprising an electromagnetic coil for producing a magnetic field of predetermined direction, means for supplying a voltage across the coil which varies in accordance with variations in a condition being monitored, displaceable means responsive to the magnetic field to assume a position related to the magnitude of the field, asymmetrically conductive means connected across the electromagnetic coil in a direction to be normally non-conductive, but responsive to a critical level of the voltage across the coil to become conductive, and current-sensitive warning means connected in circuit with the asymmetrically conductive means for producing an indication when the asymmetrically conductive means becomes conductive.

2. The combination defined in claim 1 wherein the condition being monitored is the level of the fuel in the tank, the first mentioned means includes a sender resistor and a contact displaceable along the resistor in response to variations in the level of fuel and said current-sensitive warning means is a lamp.

3. In combination: an indicating device comprising an electromagnetic coil for producing a magnetic field of predetermined direction, a source for providing electrical energy to the coil, means for varying the voltage across the coil in accordance with variations in a condition being monitored, displaceable means responsive to the magnetic field to assume a position related to the magnitude thereof, a Zener diode connected across the coils in a direction to be normally non-conductive but responsive to a critical level of the voltage across the coil to become conductive to energy from the source, and current sensitive warning means connected in series circuit with the Zener diode for producing an indication when the diode becomes conductive.

4. In combination with an indicating system having an electromagnetic coil, a source of electrical energy, and a remotely located condition responsive means connecting the source to the coil for varying the voltage across the coil in accordance with variations in the condition being monitored; means for providing an indication when the condition approaches a limit of variation including asymmetrically conductive means connected across at least a portion of the coil in a direction to be normally non-conductive, but responsive to the magnitude of the voltage across the portion of the coil to become conductive at a critical value thereof, and current sensitive indicator means connected in series with the asymmetrically conductive means for providing an indication when the critical value is reached.

5. In combination: an indicating device for monitoring the quantity of liquid in a remote container comprising an electromagnetic coil for producing a magnetic field of prescribed direction, a source of electrical energy, means connecting the source and the coil for varying the voltage across the coil as a function of the quantity of liquid in the container, and displaceable means responsive to the magnetic field to assume a position related to the magnitude of the field, asymmetrically conductive means connected across at least a portion of the coil in a direction to be normally non-conductive but responsive to the magnitude of the voltage across the portion to become conductive at a critical value thereof, and current-sensitive warning means connected in circuit with the asymmetrically conductive means for providing a warning signal when the critical value is reached.

6. The combination defined in claim 5 wherein the first mentioned means includes a sender resistor and a contact displaceable along the resistor responsive to variations in the quantity of liquid in said container and said current-sensitive warning means is a lamp.

7. A low fuel warning system comprising a gauge for providing a primary indication of the quantity of fuel in a container and including at least one electromagnetic coil for producing a magnetic field, a source of electrical energy and level responsive means connecting the source to the coil for increasing the voltage across the coil as the quantity of fuel decreases, a Zener diode connected across at least a portion of the coil in a direction to be normally non-conductive but responsive to the magnitude of voltage to become conductive at a critical value thereof corresponding to a low level of fuel in the container, and current-sensitive warning means connected in series with the diode to produce a warning signal when the diode becomes conductive.

No references cited.

NEIL C. READ, *Primary Examiner.*

T. B. HABECKER, *Assistant Examiner.*